(12) United States Patent
Wright et al.

(10) Patent No.: US 6,442,669 B2
(45) Date of Patent: *Aug. 27, 2002

(54) ARCHITECTURE FOR A PROCESS COMPLEX OF AN ARRAYED PIPELINED PROCESSING ENGINE

(75) Inventors: Michael L. Wright, Raleigh, NC (US); Darren Kerr, Palo Alto, CA (US); Kenneth Michael Key, Raleigh; William E. Jennings, Cary, both of NC (US)

(73) Assignee: Cisco Technology, Inc., San Jose, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 09/727,068

(22) Filed: Nov. 30, 2000

Related U.S. Application Data

(63) Continuation of application No. 09/106,436, filed on Jun. 29, 1998, now Pat. No. 6,195,739.

(51) Int. Cl.$^7$ .............................................. G06F 15/00
(52) U.S. Cl. ........................................ 712/19; 710/52
(58) Field of Search ...................... 712/10–22, 52–57; 710/52

(56) References Cited

U.S. PATENT DOCUMENTS

| | | | |
|---|---|---|---|
| 4,590,554 A | | 5/1986 | Glazier et al. |
| 4,598,400 A | | 7/1986 | Hillis |
| 4,709,327 A | | 11/1987 | Hillis et al. |
| 4,773,038 A | | 9/1988 | Hillis et al. |
| 4,791,641 A | | 12/1988 | Hllis |
| 4,805,091 A | | 2/1989 | Thiel et al. |
| 4,809,202 A | | 2/1989 | Wolfram |
| 4,862,392 A | * | 8/1989 | Steiner ..................... 364/522 |
| 4,870,568 A | | 9/1989 | Kahle et al. |
| 4,922,486 A | | 5/1990 | Lindsky et al. |
| 4,965,717 A | | 10/1990 | Cutts, Jr. et al. |
| 4,993,028 A | | 2/1991 | Hillis |
| 5,070,446 A | | 12/1991 | Salem |
| 5,093,801 A | | 3/1992 | White et al. |

(List continued on next page.)

OTHER PUBLICATIONS

Digital Systems Testing and Testable Design, Miron Abramovici, et al., Computer Science Press, pp. 342–409, Copyright 1990.
IEEE 1149.1 Device Architecture (continued), The Test Access Port (TAP), http://www.asset–intertech.com/homepage/bscantutr/arch3.htm#TAP, pp. 1–3, 1998.
The Principle of Boundary–Scan Architecture, http://www.asset–intertech.com/tutorial/principl.htm, pp. 1–4, 1998.
IEEE 1149.1 Device Architecture, http://www.asset–intertech.com/tutorial/arch.htm., pp. 1–4, 1998.
IEEE 1149.1 Device Architecture (continued), Using the Instruction Register (IR), http:/www.asset–intertech.com/tutorial/arch2.htm, pp. 1–4, 1998.

*Primary Examiner*—John A. Follansbee
(74) *Attorney, Agent, or Firm*—Cesari and McKenna, LLP

(57) ABSTRACT

A processor complex architecture facilitates accurate passing of transient data among processor complex stages of a pipelined processing engine. The processor complex comprises a central processing unit (CPU) coupled to an instruction memory and a pair of context data memory structures via a memory manager circuit. The context memories store transient "context" data for processing by the CPU in accordance with instructions stored in the instruction memory. The architecture further comprises data mover circuitry that cooperates with the context memories and memory manager to provide a technique for efficiently passing data among the stages in a manner that maintains data coherency in the processing engine. An aspect of the architecture is the ability of the CPU to operate on the transient data substantially simultaneously with the passing of that data by the data mover.

14 Claims, 8 Drawing Sheets

U.S. PATENT DOCUMENTS

| | | | |
|---|---|---|---|
| 5,111,198 A | 5/1992 | Kuszmaul | |
| 5,113,510 A | 5/1992 | Hillis | |
| 5,117,420 A | 5/1992 | Hillis et al. | |
| 5,129,077 A | 7/1992 | Hillis | |
| 5,148,547 A | 9/1992 | Kahle et al. | |
| 5,151,996 A | 9/1992 | Hillis | |
| 5,157,663 A | 10/1992 | Major et al. | |
| 5,175,865 A | 12/1992 | Hillis | |
| 5,212,773 A | 5/1993 | Hillis | |
| 5,222,216 A | 6/1993 | Parish et al. | |
| 5,222,237 A | 6/1993 | Hillis | |
| 5,247,613 A | 9/1993 | Bromley | |
| 5,247,694 A | 9/1993 | Dahl | |
| 5,255,291 A | 10/1993 | Holden et al. | |
| 5,261,105 A | 11/1993 | Potter et al. | |
| 5,265,207 A | 11/1993 | Zak et al. | |
| 5,274,631 A | 12/1993 | Bhardwaj | |
| 5,289,156 A | 2/1994 | Ganmukhi | |
| 5,295,258 A | 3/1994 | Jewett et al. | |
| 5,301,310 A | 4/1994 | Isman et al. | |
| 5,317,726 A | 5/1994 | Horst | |
| 5,355,492 A | 10/1994 | Frankel et al. | |
| 5,357,612 A | 10/1994 | Alaiwan | |
| 5,361,363 A | 11/1994 | Wells et al. | |
| 5,367,692 A | 11/1994 | Edelman | |
| 5,388,214 A | 2/1995 | Leiserson et al. | |
| 5,388,262 A | 2/1995 | Hillis | |
| 5,390,298 A | 2/1995 | Kuzmaul et al. | |
| 5,404,296 A | 4/1995 | Moorhead | |
| 5,404,562 A | 4/1995 | Heller et al. | |
| 5,410,723 A | 4/1995 | Schmidt et al. | |
| 5,455,932 A | 10/1995 | Major et al. | |
| 5,485,627 A | 1/1996 | Hillis | |
| 5,530,809 A | 6/1996 | Douglas et al | |
| 5,535,408 A | 7/1996 | Hillis | |
| 5,561,669 A | 10/1996 | Lenney et al. | |
| 5,617,538 A | 4/1997 | Heller | |
| 5,621,885 A | 4/1997 | Del Vigna, Jr. | |
| 5,627,965 A | 5/1997 | Lidell et al. | |
| 5,673,423 A | 9/1997 | Hillis | |
| 5,686,960 A * | 11/1997 | Sussman et al. | 348/218 |
| 5,710,814 A | 1/1998 | Klemba et al. | |
| 5,742,604 A | 4/1998 | Edsall et al. | |
| 5,751,955 A | 5/1998 | Sonnier et al. | |
| 5,764,636 A | 6/1998 | Edsall | |
| 5,787,255 A | 7/1998 | Parlan et al. | |
| 5,832,291 A | 11/1998 | Rosen et al. | |
| 5,838,915 A | 11/1998 | Klausmeier et al. | |
| 5,860,086 A | 1/1999 | Crump et al. | |
| 5,872,963 A | 2/1999 | Bitar et al. | |
| 5,960,211 A | 9/1999 | Schwartz et al. | |
| 6,035,422 A | 3/2000 | Hohl et al. | |
| 6,101,599 A | 8/2000 | Wright et al. | |
| 6,119,215 A | 9/2000 | Key et al. | |
| 6,195,739 B1 * | 2/2001 | Wright et al. | 712/19 |
| 6,272,621 B1 | 8/2001 | Key et al. | |

\* cited by examiner

ARCHITECTURE FOR A PROCESS COMPLEX OF AN ARRAYED PIPELINED PROCESSING ENGINE

CROSS-REFERENCE TO RELATED APPLICATIONS

This application is a continuation of U.S. patent application Ser. No. 09/106,436, filed Jun. 29, 1998 now U.S. Pat. No. 6,195 739, entitled "Method and Apparatus for Passing Data Among Processor Complex Stages of a Pipelined Processing Engine." The entirety of said copending application is hereby incorp by reference.

This invention is related to the following U.S. Patent Applications:

U.S. patent application Ser. No. (09/106,478) titled, PROGRAMMABLE ARRAYED PROCESSING ENGINE ARCHITECTURE FOR A NETWORK SWITCH;

U.S. patent application Ser. No. (09/106,244) titled, SYSTEM FOR CONTEXT SWITCHING BETWEEN PROCESSING ELEMENTS IN A PIPELINE OF PROCESSING ELEMENTS now U.S. Pat. No. 6,101,599; and U.S. patent application Ser. No. (09/106,246) titled, SYNCHRONIZATION AND CONTROL SYSTEM FOR AN ARRAYED PROCESSING ENGINE now U.S. Pat. No. 6,119,215, each of which was filed on even date herewith and assigned to the assignee of the present invention.

FIELD OF THE INVENTION

The present invention relates to processing engines of intermediate stations in a computer network and, in particular, to the architecture of a processing element of a pro-grammable processing engine.

BACKGROUND OF THE INVENTION

Computer architecture generally defines the functional operation, including the flow of information and control, among individual hardware units of a computer. One such hardware unit is the processor or processing engine which contains arithmetic and logic processing circuits organized as a set of data paths. In some implementations, the data path circuits may be configured as a central processing unit (CPU) whose operations are defined by a set of instructions. The instructions are typically stored in a control (instruction) memory and specify a set of hardware functions that are available on the CPU.

Specifically, the fields of an instruction specify commands which supply signals for conditioning and clocking the data paths. If the structure of the instruction allows only the specification of a single command at a time, the instruction is a vertical instruction. Only the necessary commands are specified in this type of instruction, resulting in smaller control memory requirements; yet, it is not possible to take advantage of all possible parallelisms offered by the hardware, since only one command is executed at a time. A horizontal instruction specifies all possible commands which permits programmers to take full advantage of all parallelisms in a processor to build high-performance computers.

A high-performance computer may be realized by using a number of identical CPUs or processors to perform certain tasks in parallel. For a purely parallel multiprocessor architecture, each processor may have shared or private access to non-transient data, such as program instructions (e.g., algorithms) stored in a memory coupled to the processor. Access to an external memory is generally inefficient because the execution capability of each processor is substantially faster than its external interface capability; as a result, the processor often idles while waiting for the accessed data. Moreover, scheduling of external accesses to a shared memory is cumbersome because the processors may be executing different portions of the program. On the other hand, providing each processor with private access to the entire program results in inefficient use of its internal instruction memory.

In an alternative implementation, the data paths may be configured as a pipeline having a plurality of processor stages. This configuration conserves internal memory space since each processor executes only a small portion of the program algorithm. A drawback, however, is the difficulty in apportioning the algorithm into many different stages of equivalent duration. Another drawback of the typical pipeline is the overhead incurred in transferring transient "context" data from one processor to the next in a high-bandwidth application.

One example of such a high-bandwith application involves the area of data communications and, in particular, the use of a parallel, multiprocessor architecture as the processing engine for an intermediate network station. The intermediate station interconnects communication links and subnetworks of a computer network to enable the exchange of data between two or more software entities executing on hardware platforms, such as end stations. The stations typically communicate by exchanging discrete packets or frames of data according to predefined protocols, such as the Transmission Control Protocol/Internet Protocol (TCP/IP), the Internet Packet Exchange (IPX) protocol, the AppleTalk protocol or the DECNet protocol . In this context, a protocol consists of a set of rules defining how the stations interact with each other.

A router is an intermediate station that implements network services such as route processing, path determination and path switching functions. The route processing function determines the type of routing needed for a packet, whereas the path switching function allows a router to accept a frame on one interface and forward it on a second interface. The path determination, or forwarding decision, function selects the most appropriate interface for forwarding the frame. A switch is also an intermediate station that provides the basic functions of a bridge including filtering of data traffic by medium access control (MAC) address, "learning" of a MAC address based upon a source MAC address of a frame and forwarding of the frame based upon a destination MAC address. Modern switches further provide the path switching and forwarding decision capabilities of a router. Each station includes high-speed media interfaces for a wide range of communication links and subnetworks.

The hardware and software components of these stations generally comprise a communications network and their interconnections are defined by an underlying architecture. Modern communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. Examples of communications architectures include the IPX communications architecture and, as described below, the Internet communications architecture.

The Internet architecture is represented by four layers which are termed, in ascending interfacing order, the network interface, internetwork, transport and application layers. These layers are arranged to form a protocol stack in each communicating station of the network. The lower layers of the stack provide internetworking services and the upper layers collectively provide common network application services. For example, the network interface layer comprises physical and data link sublayers that define a flexible network architecture oriented to the implementation of local area networks (LANs). Specifically, the physical layer is concerned with the actual transmission of signals across the communication medium and defines the types of cabling, plugs and connectors used in connection with the medium. The data link layer ("layer 2") is responsible for transmission of data from one station to another and may be further divided into two sublayers: logical link control (LLC) and MAC sublayers.

The MAC sublayer is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link MAC address. This MAC address is unique for each station interfacing to a LAN. The LLC sublayer manages communications between devices over a single link of the internetwork.

The primary network layer protocol of the Internet architecture is the Internet protocol (IP) contained within the internetwork layer ("layer 3"). IP is a network protocol that provides internetwork routing and relies on transportprotocols for end-to-end reliability. An example of such a transport protocol is the Transmission Control Protocol (TCP) contained within the transport layer. The term TCP/IP is commonly used to refer to the Internet architecture. Protocol stacks and the TCP/IP reference model are well known and are, for example, described in Computer Networks by Andrew S. Tanenbaum, printed by Prentice Hall PTR, Upper Saddle River, N.J. 1996.

Data transmission over the network therefore consists of generating data in, e.g., a sending process executing on the source station, passing that data to the application layer and down through the layers of the protocol stack where the data are sequentially formatted as a frame for delivery over the medium as bits. Those frame bits are then transmitted over the medium to a protocol stack of the destination station where they are passed up that stack to a receiving process. Although actual data transmission occurs vertically through the stacks, each layer is programmed as though such transmission were horizontal. That is, each layer in the source station is programmed to transmit data to its corresponding layer in the destination station. To achieve this effect, each layer of the protocol stack in the source station typically adds information (in the form of a header) to the data generated by the sending process as the data descends the stack.

For example, the internetwork layer encapsulates data presented to it by the transport layer within a packet having a network layer header. The network layer header contains, among other information, source and destination network addresses needed to complete the data transfer. The data link layer, in turn, encapsulates the packet in a frame, such as a conventional Ethernet frame, that includes a data link layer header containing information, such as MAC addresses, required to complete the data link functions. At the destination station, these encapsulated headers are stripped off one-by-one as the frame propagates up the layers of the stack until it arrives at the receiving process.

Increases in the frame/packet transfer speed of an intermediate station are typically achieved through hardware enhancements for implementing well-defined algorithms, such as bridging, switching and routing algorithms associated with the predefined protocols. Hardware implementation of such an algorithm is typically faster than software because operations can execute in parallel more efficiently. In contrast, software implementation of the algorithm on a general-purpose processor generally performs the tasks sequentially because there is only one execution path. Parallel processing of conventional data communications algorithms is not easily implemented with such a processor, so hardware processing engines are typically developed and implemented in application specific integrated circuits (ASIC) to perform various tasks of an operation at the same time. These ASIC solutions, which are generally registers and combinational logic configured as sequential logic circuits or state machines, distinguish themselves by speed and the incorporation of additional requirements beyond those of the basic algorithm functions. However, the development process for such an engine is time consuming and expensive and, if the requirements change, inefficient since a typical solution to a changing requirement is to develop a new ASIC.

Thus, an object of the present invention is to provide a processor architecture for an intermediate station that approaches the speed of an ASIC solution but with the flexibility of a general-purpose processor.

Another object of the present invention is to provide a processing engine having a plurality of processing elements that efficiently execute conventional network service algorithms.

Still another object of the present invention is to provide an architecture of a processing element of a programmable processing engine that enables efficient and accurate context data transfers from one element to the next in a high-bandwidth application.

SUMMARY OF THE INVENTION

The invention comprises an architecture for efficiently passing data among processor complex stages of a pipelined processing engine. The processor complex comprises a central processing unit (CPU) coupled to an instruction memory and a pair of context data memory structures via a memory manager circuit. The context memories store transient "context" data for processing by the CPU in accordance with instructions stored in the instruction memory. The memory manager manages interactions among the components of the processor complex by, inter alia, mapping a contiguous memory address space viewed by the CPU to the contents of the various memories residing within the processor complex.

In accordance with the invention, the architecture of the processor complex facilitates accurate passing of transient data among the stages of the engine. To that end, the processor complex further comprises data mover circuitry that cooperates with the context memories and memory manager to provide a technique for efficiently passing data among the stages in a manner that maintains data coherency in the processing engine. Data coherency is maintained by the memory manager constantly "snooping" the data mover and CPU to determine the state of the data accessed by the data mover and CPU. A notable aspect of the architecture is the ability of the CPU to operate on the transient data substantially simultaneously with the passing of that data by the data mover.

Advantageously, the context passing technique described herein enhances the speed of data execution in a pipelined processing engine by substantially reducing the latency involved with passing the data among stages of the engine. The transient data entering the engine is dispatched to a processor complex stage of a pipeline for processing by a CPU prior to serially passing the data to a "downstream" processor complex stage. The processor complex architecture described herein facilitates the passing of transient data from an "upstream" context memory to a corresponding downstream memory as the CPU processes the data. Thus, the invention transforms an otherwise serial data processing/passing procedure to a parallel process via pipelining.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
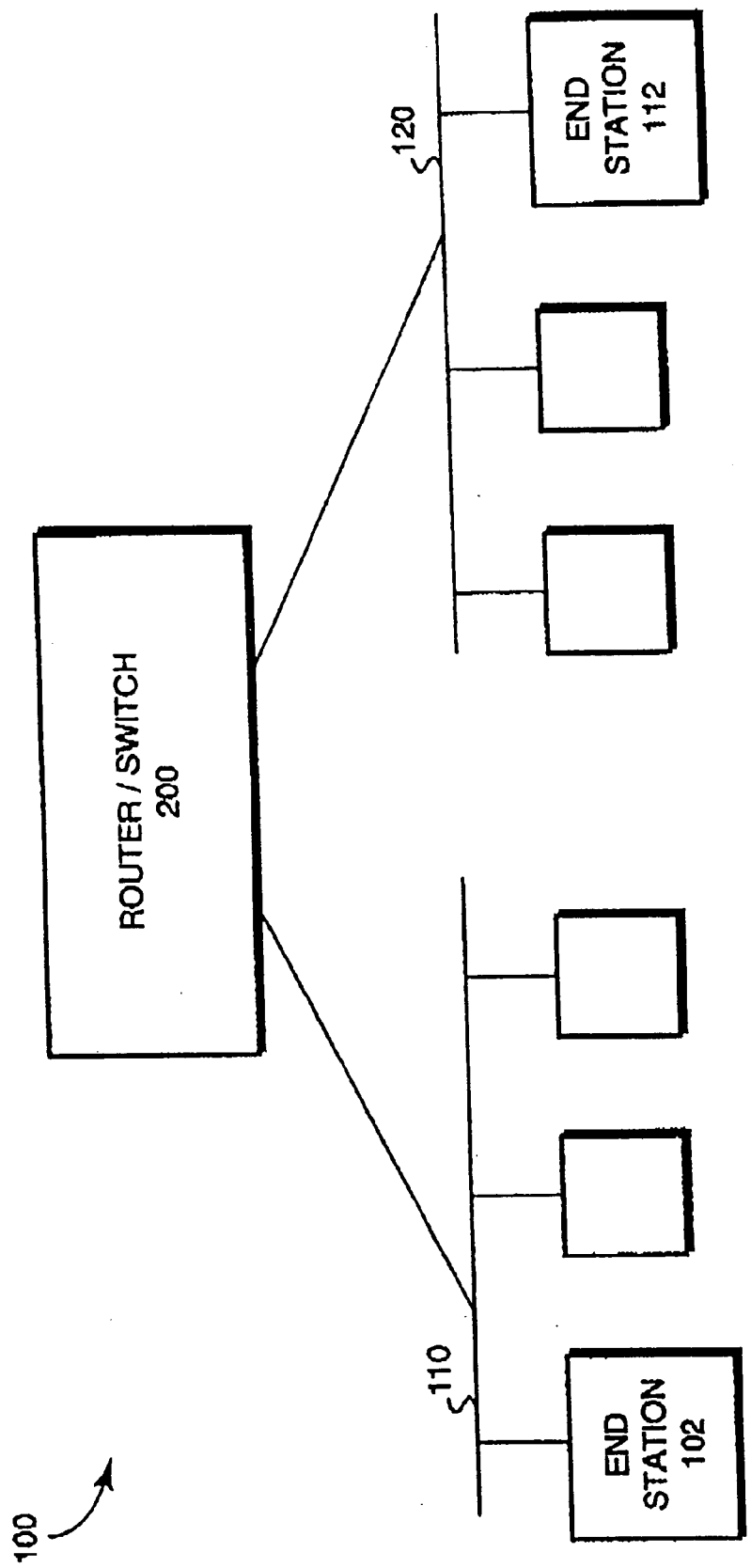
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANS) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
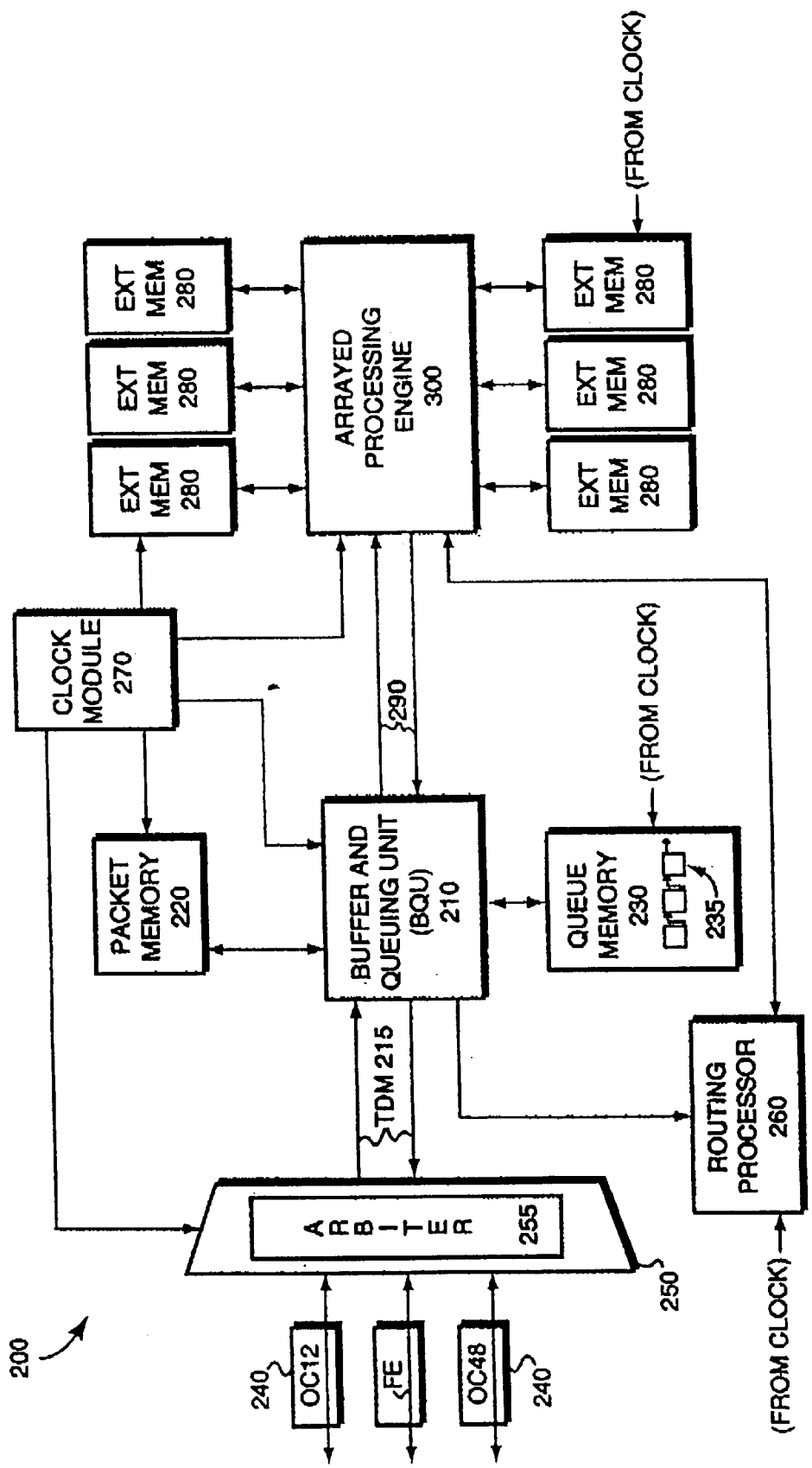
FIG. 2 is a schematic block diagram of intermediate station, such as a network switch, that may be advantageously used with the present invention.

FIG. 2 is a schematic block diagram of intermediate station 200 which, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the inventive architecture described herein is the ability to program the station for execution of either layer 2 and layer 3 operations. To that end, operation of the switch will be described with respect to IP switching of packets, although the switch may be programmed for other applications, such as data encryption.

The switch 200 comprises a plurality of interconnected components including an arrayed processing engine 300, various memories, queueing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for in-terconnecting the processing engine with a plurality of line cards 240 via a selector circuit 250. The line cards 240 may comprise OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many (e.g., thousands) input/output channels on these interfaces, each of which is associated with at least one queue 235 in the queue memory 230. The processing engine 300 generally functions as a switching processor that modifies packets and/or headers in sequence as the BQU 210 implements queuing operations.

A route processor (RP) 260 executes conventional routing protocols for communication directly with the processing engine 300. The routing protocols generally comprise topological information exchanges between intermediate stations to determine optimal paths through the network based on, e.g., destination IP addresses. These protocols provide information used by the RP 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
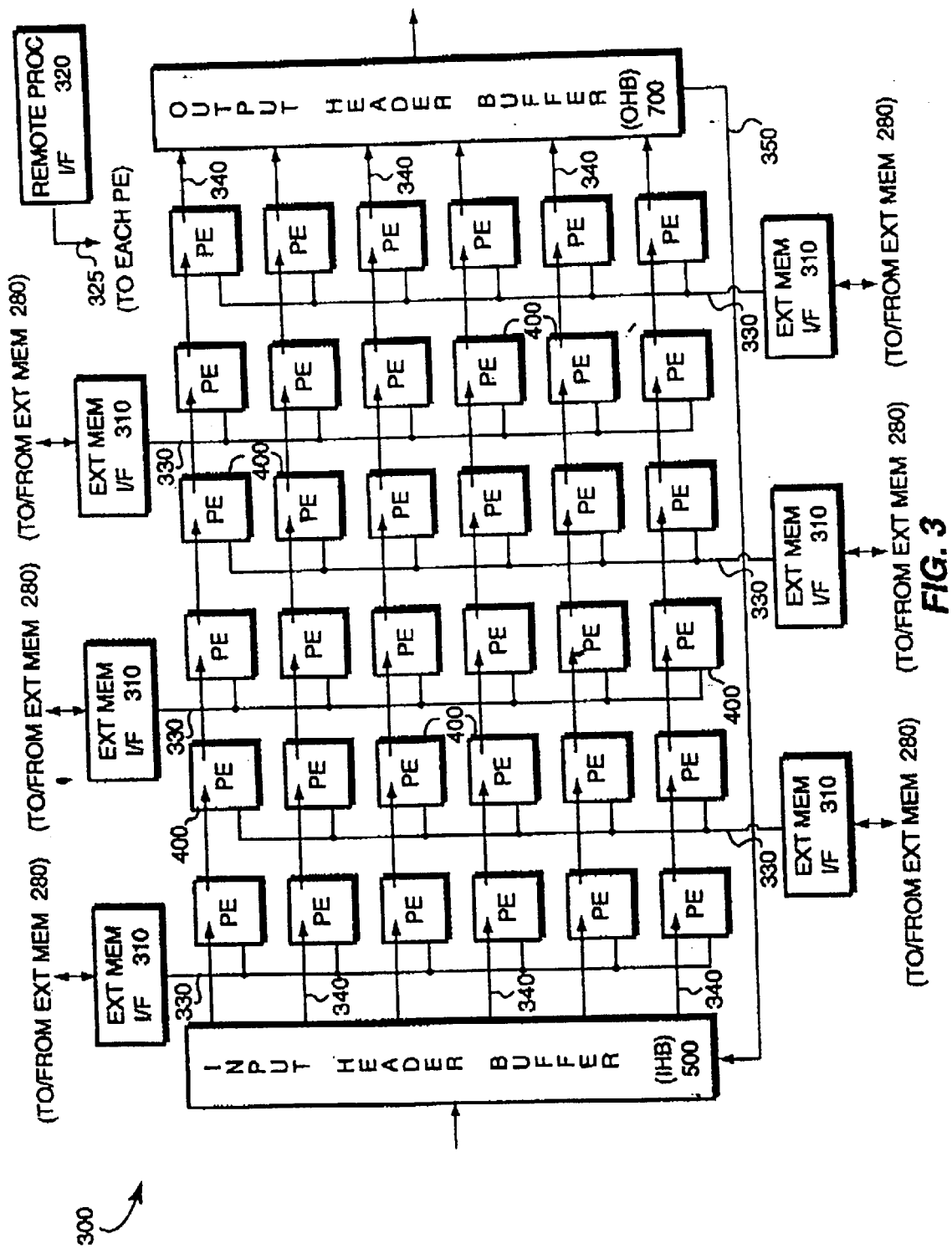
FIG. 3 is a schematic block diagram of a programmable arrayed processing engine having a plurality of processor complex elements.

FIG. 3 is a schematic block diagram of the programmable processing engine 300 which generally comprises an array of processing elements embedded between input and output header buffers with a plurality of interfaces from the array to an external memory. The external memory stores non-transient data organized within data structures for use in processing the transient data. The non-transient data typically includes "table" data contained in forwarding and routing tables, statistics, access filters, encryption keys and/ or queuing information. Transient data enters and exists the engine via 200 MHz 128-bit input and output data interfaces of the BQU 210. Each processing element contains an instruction memory that allows programming of the array to process the transient data as baseline or extended pipelines operating in parallel. A remote processor interface (I/F) 320 provides instructions from a remote processor (not shown) to the PEs over a 32-bit maintenance bus 325 having multiplexed address/data lines for storage in their instruction memories.

In the illustrative embodiment, the processing engine 300 comprises a plurality of processing elements (PE) 400 symmetrically arrayed as six (6) rows and six (6) columns in a 6×6 arrayed configuration that is embedded between an input header buffer (IHB) 500 and an output header buffer (OHB) 700. A 64-bit feedback path 350 couples the OHB 700 to the IHB 500 and provides a data path for recycling data through the PE stages of the processing engine. The PEs of each row are configured as stages connected is in series by a 100 MHz 64-bit direct memory access (DMA) data path 340 that synchronously transfers data and control "context" from one PE to the next. This arrangement enables data processing to occur as a highlevel pipeline that sequentially executes operations on the transient data. The PEs of each column operate in parallel to perform substantially the same operation on that data, but with a shifted phase. An example of an arrayed processing engine and network switch suitable for use with the present invention is described in copending and commonly-owned U.S. patent application Ser. No. 09/106,873 titled Programmable Arrayed Processing Engine Architecture for a Network Switch, which application is hereby incorporated by reference as though fully set forth herein.

Figure 4:
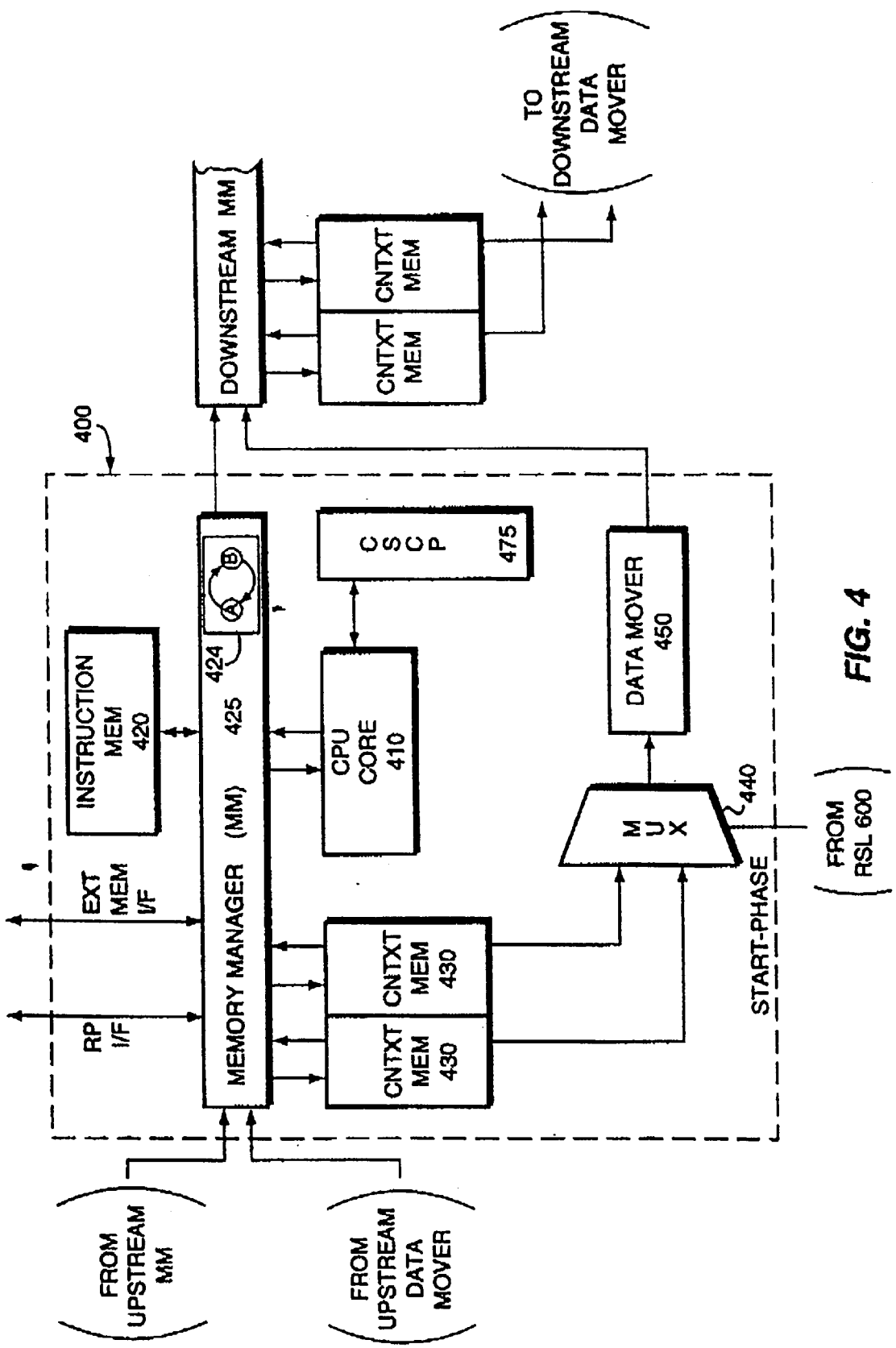
FIG. 4 is a schematic block diagram of a processor complex element having a central processing unit (CPU), context memories, a memory manager and a data mover in accordance with the present invention.

FIG. 4 is a schematic block diagram of a PE 400. The PE is a processor complex that preferably comprises a central processing unit (CPU) core 410 coupled to an instruction memory 420 and a pair of context data memory (Cntxt Mem) structures 430 via a memory manager (MM) circuit 425. The context memories store transient data, such as frame/packet headers and/or data, for processing by the CPU in accordance with instructions stored in the instruction memory, which is preferably a 4Kx32 single port synchronous random access memory device. The MM 425 provides the instructions and data to the CPU in response to requests for that information. The MM also provides an interface to an external memory resource configured to store non-transient data, such as table data, for use by the CPU.

The CPU 410 is preferably a small processor core having a dense structure which enables implementation of similar cores on an application specific integrated circuit (ASIC). In the illustrative embodiment described herein, the CPU is a 32-bit, 100MHz Advanced RISC Machine (ARM) 7TDI core capable of executing 16-bit or 32-bit instructions; however, it will be apparent to those skilled in the art that other CPU cores may be advantageously used with the processor complex architecture described herein. The ARM CPU includes an arithmetic logic unit (ALU), internal registers for storing information processed by the ALU, and an instruction fetch and decode unit that decodes instructions fetched from the instruction memory. The instructions are generally vertical assembly language code manifested in the form of conventional reduced instruction set computer (RISC) instructions.

Each context memory 430 is a 16×64 dual port, byte writable register file containing data for processing by the CPU 410. One context memory (CMA) is associated with a phase A context and the other (CMB) is associated with a phase B context. During a current pipeline phase, the CPU accesses data from its current context, which may be alternately stored in CMA and CMB. Any modification of data is written to the current context memory as well as to the downstream complex's next context memory (e.g., current context memory CMA and downstream context memory CMB).

Each cell in the context memory generally contains header data and "scratch" area for CPU operations. A portion of each memory is accessible to the CPUs for immediate operations without load/store penalities. The scratch area may contain "context" such as status information, information about the original packet and information that instructs the downstream CPU how to process the transient data. For example, assume tree data structure (mtrie) lookup operations are apportioned among several CPUs. A first CPU performs a first lookup and, as a result of its designated processing, retrieves a pointer to the next address location to be accessed. The CPU stores the retrieved pointer in the scratch area of the context memory and passes the pointer as "context" to the downstream CPU at the end of the current phase. The downstream CPU uses the pointer to perform the next lookup operation. Thus, in accordance with the present invention, context data is passed among processor complexes of the pipeline to enable a downstream CPU to take advantage of meaningful work performed by an upstream CPU.

The MM 425 comprises logic circuitry that provides the electrical, mechanical and data signaling needed to interface to a memory bus coupling the processor complex and external memory. The manager further includes data path and control logic for managing the interactions of the individual components within the processor complex. For example, memory manager contains circuitry for mapping a "flat" 4 Gb contiguous memory address space viewed by the CPU 410 to the contents of various physical memories residing internal and external to the processor complex (e.g., instructions stored in memory 420, transient data stored in context memories 430, information stored in the internal control registers of CPU 410 and non-transient data, such as FIB data, stored in the external partitioned memory). The MM 425 further includes a state machine 424 that determines the current phase (A or B) to which all CPUs of the processing engine are synchronized; as noted, the current phase specifies from which context memory (CMA or CMB) the CPU processes data.

In accordance with the invention, the architecture of the PE 400 facilitates accurate passing of transient context data among the PE stages of the engine 300. To that end, the PE 400 further comprises a data mover circuit 450 that cooperates with the context memories 430 and MM 425 to efficiently pass data among the PE stages in a manner that maintains data coherency in the processing engine. The data mover 450 generally comprises an address incrementor and interface logic, coupled to a multiplexer 440, that retrieves context data from a current context memory and loads it into a context memory of an adjacent "downstream" processor complex of the pipeline. Data transfers between context memories generally take place over the memory manager data paths; that is, transfers from the CPU to the downstream context memories and from the data mover to the downstream context memories are all via the memory manager. Illustratively, transfer of an entire 128-byte context from an upstream context memory to a downstream context memory consumes 16 cycles (one 64-bit word transfer per cycle). The data mover further comprises a context size register that specifies a context size (number of 64-bit words or number of cycles) of data to be moved to the available downstream context memory 430.

As described further herein, an aspect of the processor complex architecture is the ability of the CPU 410 to operate on the transient data substantially simultaneously with the passing of that data among adjacent context memories by the data mover 450. Specifically, the context memories CMA and CMB function as ping-pong buffers by allowing the CPU core to process context data stored in one of the buffers as the other buffer is loaded with context data received from an adjacent "upstream" processor complex. Prior attempts to transfer such context generally consumed a significant amount of overhead; is according to the inventive processor complex architecture, the ping-pong buffers cooperate with the data mover circuity to enable transfer of such context in an efficient manner.

Data coherency is further ensured with the architecture by the memory manager constantly "snooping" the data mover 450 and CPU core 410 "behind-the-scene" to determine the state of the context data accessed by the data mover and CPU. After data in a current context memory (e.g., CMA) is processed by the CPU 410, the CPU writes the processed data to a downstream context memory (CMB); meanwhile, the data mover 450 transparently (to the CPU) passes the data from CMA to the downstream CMB. At the end of the current phase, the context memories are switched so that the CPU operates on the data in CMB. In the event of write collisions between the CPU and data mover to a same context location, the memory manager 425 provides the CPU with exclusive access to the data item. This aspect of the novel context passing technique ensures data coherency and consistency among the processor complex elements of the engine.

Figure 5:
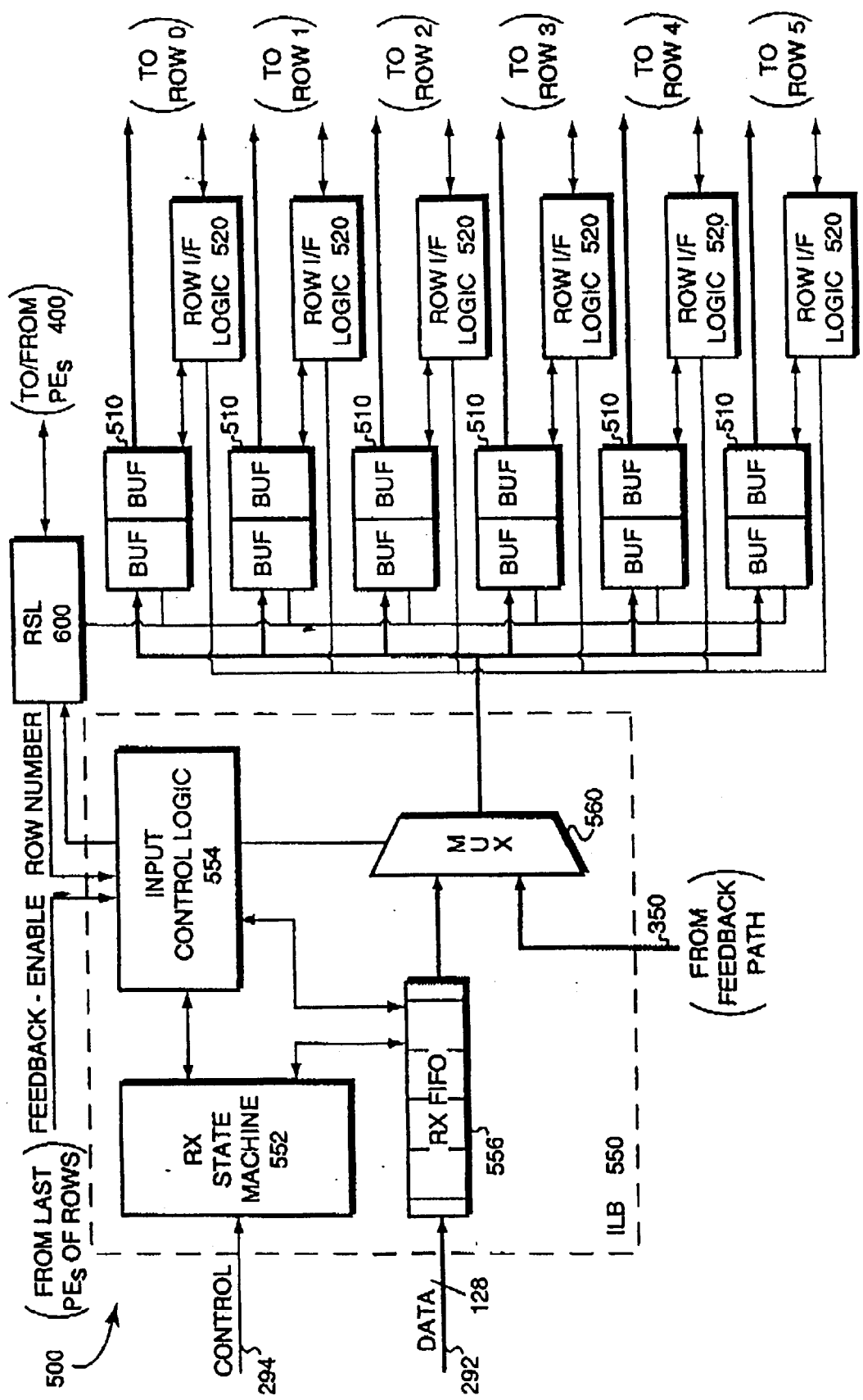
FIG. 5 is a schematic block diagram of an input header buffer (IHB) of the programmable arrayed processing engine.

FIG. 5 is a schematic block diagram of the IHB 500 which functions as a sequencer to control the PE stages of the processing engine such that the columned PEs may perform their operations at staggered, shifted phases with respect to each other. To that end, a new phase for each row is started by the IHB when all of the PE stages finish processing their current "context" and new, incoming context is completely received for that row from the data interface or feedback path, and the context in the OHB for that row has been transmitted. The IHB 500 receives data from either the data interface of the BQU 210 or from the feedback path 350 and provides the data to each pipeline in succession with feedback data generally having priority over incoming data. The data interface preferably includes a path 290 comprising a 128-bit data portion 292 and a control portion 294 for transferring predetermined control signals that manage the flow of data to (and from) the engine. Broadly stated, the IHB advances a pipeline row and provides a packet to a first stage of a next row in response to a completion signal from each stage of the rows. In the illustrative embodiment, all of the pipelines generally advance at the is same time so that if one stage of a pipeline stalls, then all of the pipelines stall.

The IHB 500 comprises a plurality of buffer pairs (BUF 510), similar to the context memories 430 of a processor complex element 400, with each pair associated with a pipeline row. As transient data enters the engine, it is sequentially loaded into one of the paired buffers 510 for a particular row before being dispatched to a first stage of that row. The IHB presents a context-in/context-out interface (row I/F logic 520) that provides write enable, data and address signals to and from the buffers and context memories; preferably, the logic 520 is substantially identical to the data mover 450 of each PE 400. This enables the processing engine to scale efficiently, thereby allowing the pipelines to be as "deep" as desired.

The IHB also includes an input logic block (ILB 550) comprising a receive (Rx) state machine 552 coupled to an input control logic circuit 554 and an input buffer 556. The input buffer is preferably organized as a first-in, first-out (Rx FIFO) buffer that sequentially receives and transmits data forwarded to the engine by the BQU 210. The Rx state machine receives the predetermined control signals over path 294 and cooperates with the logic 554 to control the transfer of data from FIFO 556. In addition, the logic circuit 554 controls a multiplexer 560 having inputs coupled to an output of the FIFO and the feedback path 350. The logic 554 enables the multiplexer to select one of its inputs in response to a control signal (feedback_enable) provided by the last PE stages of the pipe-lines. Furthermore, the logic 554 generates write enable signals (in response to a control signal provided by row synchronization logic 600) and buffer addresses that enable the row I/F logic 520 to transfer the contents of the buffers 510.

Figure 6:
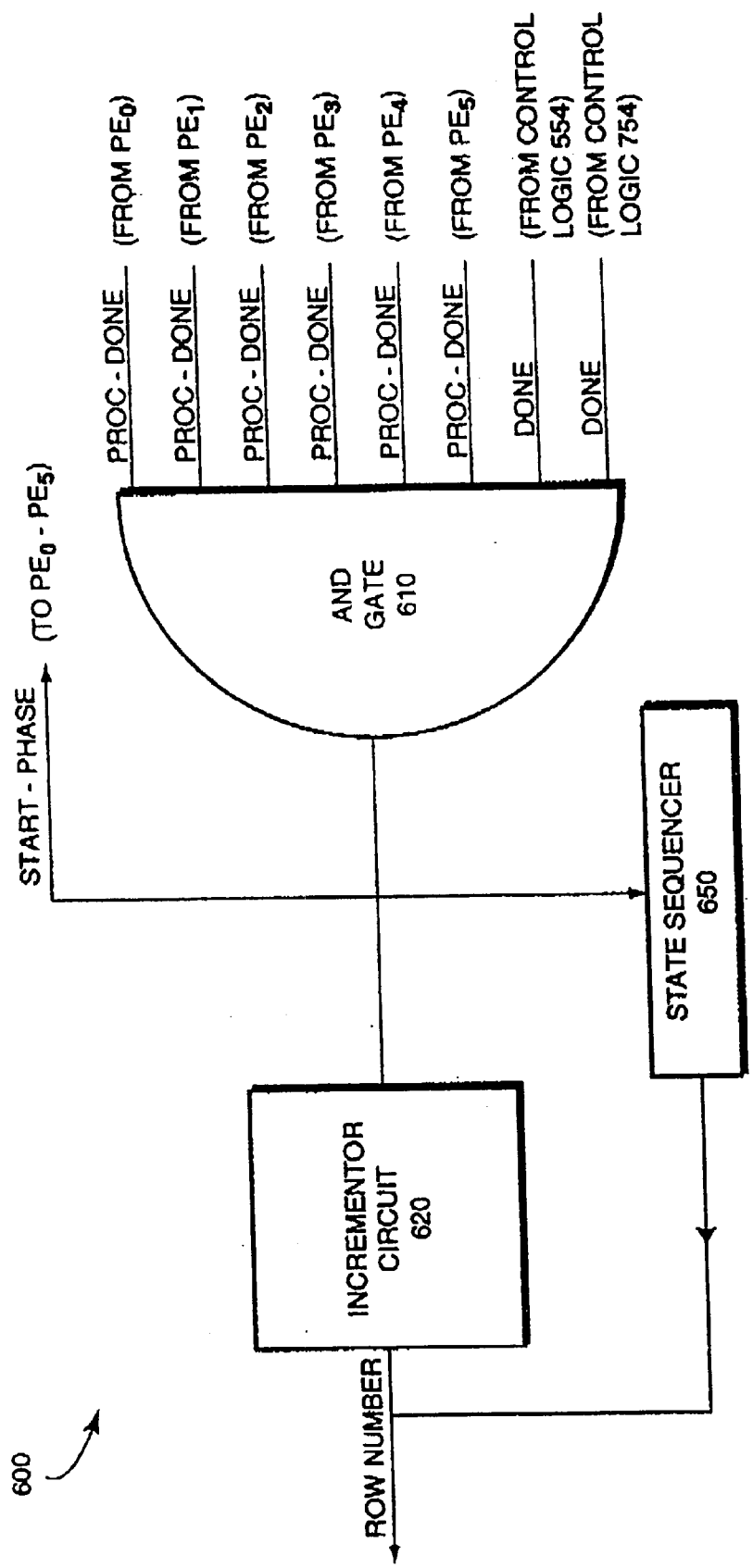
FIG. 6 is a schematic block diagram of a row synchronization logic circuit of the IHB.

FIG. 6 is a schematic block diagram of row synchronization logic (RSL) 600 that controls the pipelines by ensuring that each PE stage completes its processing of current to context prior to loading new context at a new phase. To that end, the RSL comprises logic circuitry associated with each pipeline row of the arrayed processing engine. For ease of depiction, circuitry associated with one row will be described, although it will be understood to those skilled in the art that the circuitry associated with the other rows are substantially similar.

The RSL 600 receives processing completion status from each PE stage prior to advancing the pipelines. Specifically as each PE 400 finishes its task, it asserts a global pipeline completion signal (proc_done) that is collected by a logic circuit, schematically shown as an AND gate 610. Other completion signals (done) are provided as inputs to the gate from the control logic 554, 754. In response to assertion of all completion signals, the gate 610 generates a beginning of next phase signal (start_phase). The start_phase signal informs each PE stage that there is valid context data in its context memory that its CPU core can begin processing. In addition, start_phase signal is transformed by an incrementor circuit 620 into incremented row number, while being analyzed by a state sequencer circuit 650 prior to being fed to the input control logic 554.

According to the inventive context passing technique, the IHB 500 enables the multiplexer 440 to effectively switch between the context memories 430 when transferring data. In response to the start_phase command issued by the RSL 600 to each PE 400 signifying the beginning of a next phase, the multiplexer 440 is instructed to switch context for the next data transfer. As the CPU 410 completes processing the data in one of the buffers, e.g., CMA, the MM 425 "switches" the CPU 410 to the other buffer, e.g., CMB, for processing of the next context data. Meanwhile, the data mover 450 loads the context data processed by the CPU into a context memory 430 of the downstream PE 400 as an upstream data mover loads yet a next context data into the now available buffer CMA. In an embodiment of the invention, the CPU core 410 may generally process data stored in a buffer 430 as the data mover 450 moves data in that buffer to a downstream buffer 430. However, the downstream CPU cannot begin operating on the data moved into its context memory until the upstream CPU has completed its processing.

Figure 7:
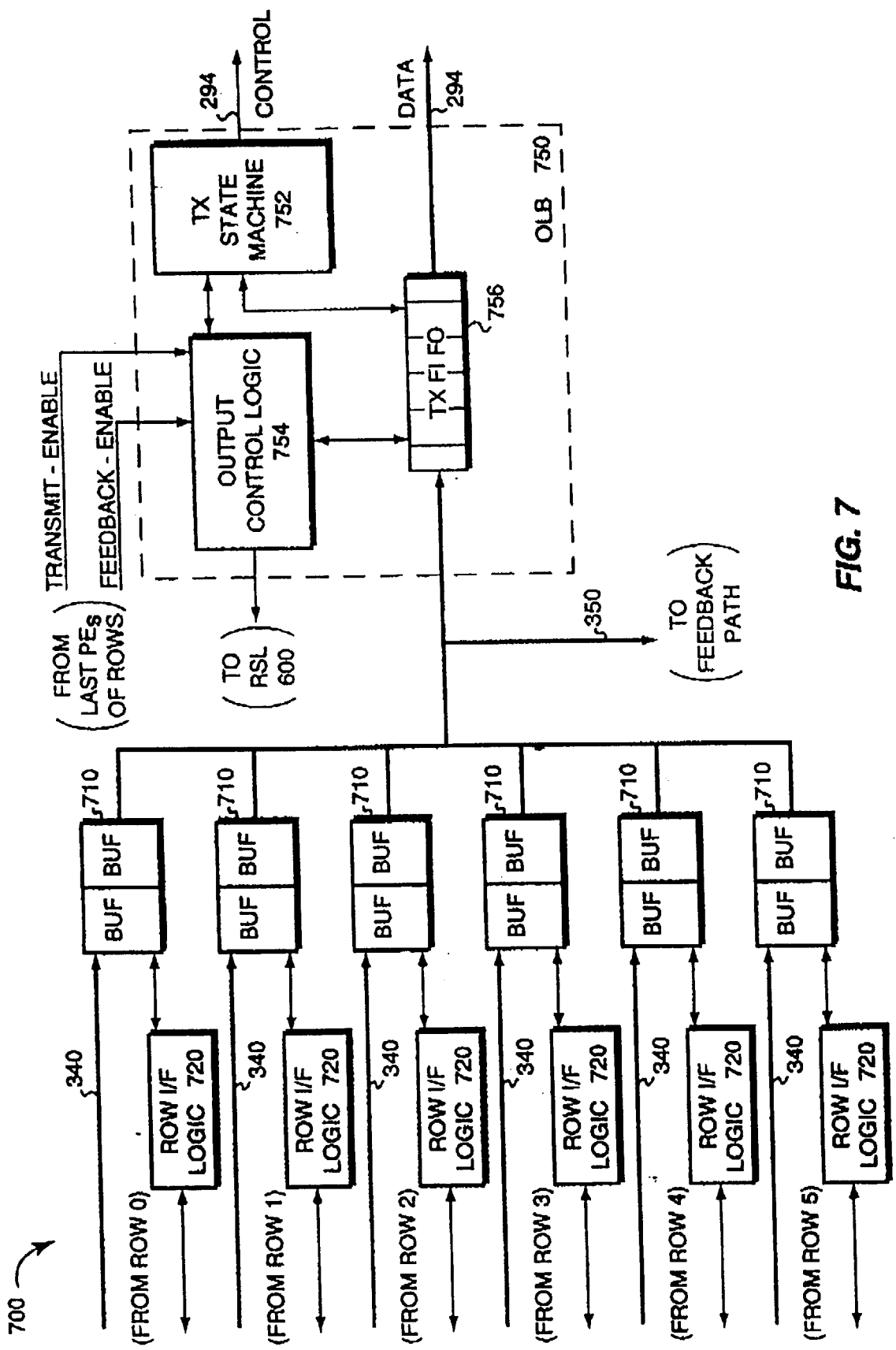
FIG. 7 is a schematic block diagram of an output header buffer of the programmable arrayed processing engine.

Upon completion of processing by all of its stages, a pipeline row is selected to deliver its data to the OHB 700 in a synchronous manner. FIG. 7 is a schematic block diagram of the OHB 700 whose internals are substantially similar as those of the IHB 500. That is, the OHB comprises a plurality of buffer pairs (BUF 710), each of which is associated with a pipeline row for receiving data processed by the row. Row I/F logic is 720 provides write enable, data and address signals to and from the buffers and context memories of the PEs. In addition, the OHB includes an output logic block (OLB 750) comprising a transmit (Tx) state machine 752 coupled to an output control logic circuit 754 and an output buffer organized as a Tx FIFO 756 that sequentially transfers data from the engine to the BQU 210.

Figure 8A:
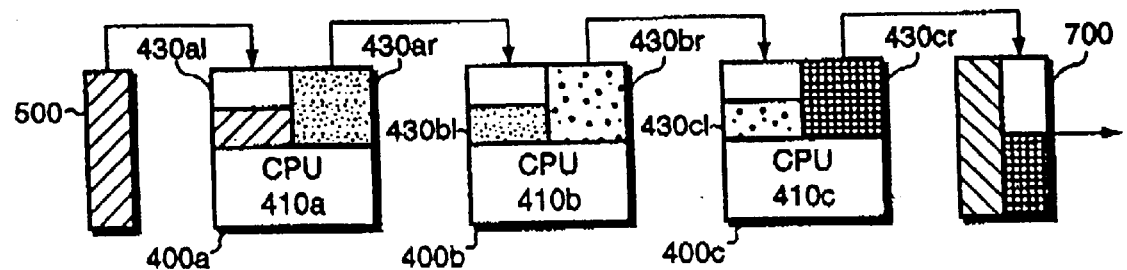
FIGS. 8A–8D are highly schematized block diagrams illustrating the flow of data among processor complex elements in accordance with a context passing technique of the present invention.

FIGS. 8A–8D are highly schematized block diagrams illustrating the flow of data among PE stages in accordance with the context passing technique of the present invention. In FIG. 8A, a first phase is started as CPU 410a operates on data previously loaded into the right ping-pong buffer 430ar while the IHB 500 loads context data into the left ping-pong buffer 430al. Similarly, CPU 410b operates on data previously loaded into its right ping-pong buffer 430br as the upstream data mover moves data into the left pingpong buffer 430bl and CPU 410c operates on previously loaded data in its right ping-pong buffer 430cr as data is moved into the left ping-pong buffer 430cl. Meanwhile, the data mover of the last processor complex 400c moves data processed by the CPU 410c to the OHB 700, which then forwards the data out the engine.

Figure 8B:
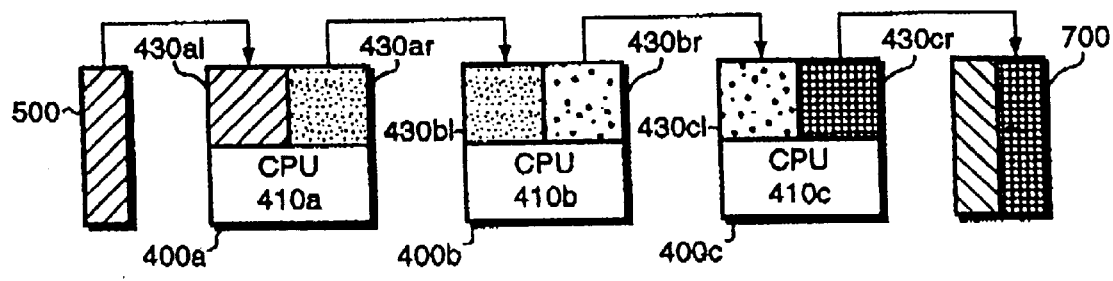

FIG. 8B depicts completion of the data transfers to the downstream context memories while the CPUs continue processing the same context data. Also, the IHB 500 finishes loading the next context into the context memory 430al of processor complex 400a and the processor complex 400c completes loading of the processed data into the OHB 700. Note that the CPUs continue operating on the same context data until the entire data is transferred by their data movers to the downstream context memories.

As noted, data coherency is maintained in the processing engine by the memory manager 425 resolving any contention/collisions between the data mover and CPU. More specifically, if the data mover and CPU simultaneously access a data item location, e.g., to move data that is ready for processing by the CPU, the memory manager 425 ensures that the CPU "wins" access to the item. Coherency is further ensured by directing all write operations executed by the CPU to both the current and appropriate downstream context memories. That is, the CPU writes processed data (via the memory manager) to the downstream context memory as the data mover 450 moves data from the current buffer to the downstream memory.

Figure 8C:
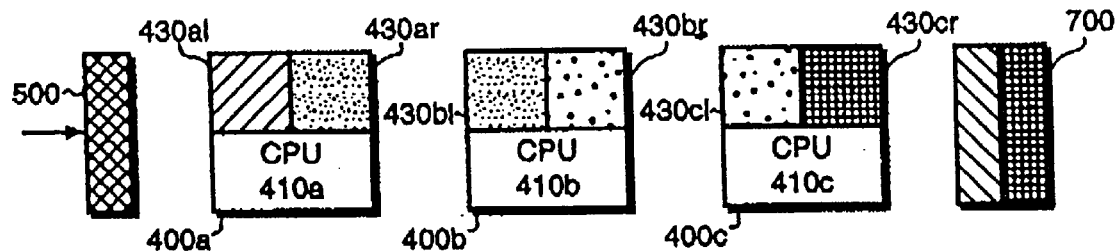
Figure 8D:
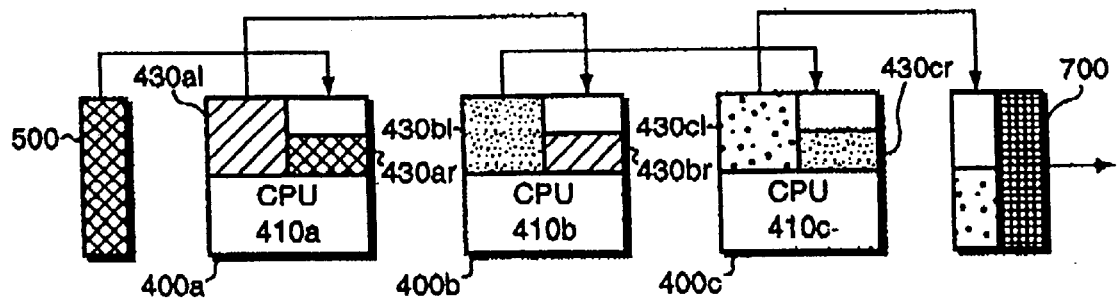

Referring to FIG. 8C, the CPUs have completed processing of the data stored in their right ping-pong buffers 430xr and the data movers have completed loading the data contexts into the left ping-pong buffers 430xl. In addition, new context data is received into the IHB 500. A next phase is then started in FIG. 8D as the memory managers switch the CPUs to process the context data stored in the left ping-pong buffers 430xl while the data movers move the processed data into the respective downstream right ping-pong buffers 430xr. Here, the IHB 500 loads the new context data into the right ping-pong buffer 430ar of the processor complex 400a as the processor complex 400c loads processed data into the OHB 700.

Operation of the processor complex to efficiently pass context data among processor complex elements of a pipelined processing engine will now be described in connection with the drawings. At the beginning of each phase, each CPU 410 performs one of the subtasks stored in the instruction memory 420, reads data from one of the two up-stream context memories 430 to which it has access and writes processed data to one of the two downstream context memories to which it has access. Simultaneously, the contents of an upstream context memory are moved to a downstream context memory by data mover 450, transparent to the CPU. Note that write operations performed by the CPU to the downstream context are preserved. The minimum number of cycles per phase is at least equal to the number of cycles needed to transparently transfer the data from the upstream context to the downstream context. For a 128-byte context memory and a 64-bit wide data path, a minimum of 16 cycles is required.

The end of a phase is determined when each CPU 410 has finished its task and has issued a special co-processor instruction that is decoded by a coprocessor coupled to each CPU. The special co-processor instruction is preferably a Coprocessor Data oPeration (CDP) instruction that is decoded by a context switch coprocessor (CSCP) 475. The CDP instruction is also used to convey other information to both its CSCP and the downstream CSCP, such as the next code entry point or a prefetch address for the downstream CPU's next task. The CSCP 475 synchronizes context switching with all processor complex elements of a pipeline row by managing phase starts, stops and stalls within the processor complex. In addition, the CSCP passes a program counter to a downstream CSCP (and receives a program counter from an upstream CSCP). The last CSCP in a row indicates to the OHB how to handle the context from the last CPU in a row, i.e., transmit context out the engine, feedback context to a next available row for further processing, transmit and feedback (for multicasts) or neither (discard).

At the end of the phase, context for each processor complex is switched to the alternate upstream and downstream context memories, and a new phase begins. Notably, all CPUs 410 of the engine 300 are synchronized to either phase A or B; the phase further determines from which context memory (CMA or CMB) the CPU fetches data. Thus, the downstream context for one CPU becomes the upstream context for the next CPU in the new phase, allowing seamless transfer of context data from CPU to CPU in a serial manner.

For example as each CPU completes its task for a particular phase, it issues a CDP instruction (e.g., 3rd from last instruction in a subroutine) to the CSCP 475. The CDP instruction contains the program counter (or a vector into a table) to be passed to a downstream CSCP, along with a context switch control (CSC) field that is updated appropriately. Notably, only the last CPU in a row sets bits in the CSC. Upon receiving the CDP instruction, the CSCP asserts a proc_done signal to the IHB signalling completion of the current phase. At this point, each CSCP (except for the last CSCP of a row) stalls the CPU (by, e.g., asserting a halt signal) and waits for two events to occur: receipt of a new program counter from the upstream CSCP and assertion of start_Phase by the IHB. In response to these events, the CSCP de-asserts the halt signal and forces the program counter into the CPU as a new phase begins.

In summary, the context passing technique described herein enhances the speed of data execution in a pipelined processing engine by substantially reducing the latency involved with passing the data among stages of the engine. Note that transient context data entering the engine is dispatched to a processor complex stage of a pipeline for processing by a CPU prior to serially passing the data to a downstream processor complex stage. The processor complex architecture described herein facilitates the passing of transient data from an upstream context memory to a corresponding downstream memory as the CPU processes the data. Moreover, the data mover may be programmed to inconspicuously move any type of context data, such as network layer headers in the case of packet switching operations or the contents of entire data frames in the case of encryption operations, from the context memories (ping-pong buffers) during such CPU processing. Thus, the invention transforms an otherwise serial data processing/passing procedure to a parallel process.

While there has been shown and described an illustrative embodiment of a processor complex architecture that facilitates accurate passing of transient context data among processor complex stages of a pipelined processing engine while maintaining data coherency in the engine, it is to be understood that various other adaptations and modifications may be made within the spirit and scope of the invention. For example, in an alternate embodiment of the invention, the CPU core 410 is preferably a custom processor having a 96-bit horizontal microcoded instruction set that improves the performance of the processing engine. Yet despite the type of CPU core used in the processor complex, a significant aspect of the inventive architecture is the programmability of the CPU cores, i.e., the processor logic is not hardwired. Advantages of such a programmability feature include the ability to continuously "tune" the algorithms executed by the processing engine as well as the flexibility in implementing various types of algorithms executed by the engine.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for passing transient data among processor complex stages of a pipelined processing engine, each processor complex stage including a central processing unit (CPU), the apparatus comprising:

a pair of context memories storing the transient data for processing by the CPU;

data mover cooperatively coupled to the context memories to pass the transient data among the stages of the engine substantially simultaneously with the processing of the data by the CPU;

an instruction memory storing instructions used by the CPU to process the transient data;

a memory manager interconnecting the instruction memory, the context memories and the CPU, the memory manager mapping a contiguous address space viewed by the CPU to contents of the instruction memory and context memories;

wherein the memory manager comprises a state machine that determines a current phase specifying one of first and second context memories used by the CPU to process data.

2. A method for passing transient data among processor complex stages of a pipelined processing engine, each processor complex stage including a central processing unit (CPU), the method comprising the steps of:

storing the transient data in a pair of context memories;

processing the stored transient data at the CPU;

passing the stored transient data among the stages of the engine substantially simultaneously with the processing of the data by the CPU;

storing instructions for processing the stored transient data in an instruction memory;

interconnecting the instruction memory, the context memories and the CPU with a memory manager;

determining a current phase using a state machine of the memory manager; and specifying, during the current phase, one of first and second context memories for use by the CPU in accordance with the step of processing the stored transient data.

3. The method of claim 2 further comprising the step pf mappping a contiguous address space viewed by the CPU to contents of the instruction memory and context memories.

4. The method of 2 wherein the stored transient data is passed among the stages using a data mover and wherein the step of passing the stored transient data among the stages of the engine in a manner that is transparent to the CPU.

5. The method of claim 4 further comprising the steps of:

snooping the data mover and CPU to determine a state of the stored transient data accessed by the CPU and the data mover prior to the steps of processing and passing; and in the event of a collision between the CPU and data mover to a same location for storing the transient data, providing the CPU with exclusive access to the data at the same location, thereby ensuring data coherency.

6. Apparatus for passing transient data among processor complex stages of a pipelined processing engine, each processor complex stage including a central processing unit (CPU), the apparatus comprising:

a pair of context memories storing the transient data for processing by the CPU;

an instruction memory storing instruction used by the CPU to process the transient data;

a memory manager interconnecting the instruction memory, the context memories and the CPU, the memory manager mapping a contiguous address space viewed by the CPU to contents of the instruction memory and context memories;

a data mover cooperatively coupled to the context memories to pass the transient data among the stages of the engine substantially simultaneously with the processing of the data by the CPU; and a multiplexer having inputs coupled to each of the context memories and an output coupled to the data mover.

7. Apparatus for passing data among stages of a pipelined processing engine, each stage including a central processing unit (CPU), the apparatus comprising:

a loaded context memory and a receiving context memory coupled to the CPU, the receiving context memory receiving data from an upstream stage while the CPU operates on data in the loaded context memory, and upon completion of operation on the data in the loaded context memory the CPU switching to operate on data received into the receiving context memory; and a data mover cooperatively coupled to the loaded and receiving context memories to receive the data from the loaded context memory while the CPU is operating on the data in the loaded context memory, the loaded and receiving context memories serving as ping-pong buffers for simultaneously holding data in the loaded context memory for operation by the CPU, and receiving data from an upstream stage into the receiving context memory.

8. The apparatus as in claim 7 further comprising:

the data mover and the CPU coupled to write results of the CPU operating on data in the loaded context memory into a receiving context memory of a downstream stage.

9. Apparatus for passing data among stages of a pipelined processing engine, each stage including a central processing unit (CPU), the apparatus comprising:

a loaded context memory and a receiving context memory coupled to the CPU, the receiving context memory receiving data from an upstream stage while the CPU operates on data in the loaded context memory, and upon completion of operation on the data in the loaded context memory the CPU switching to operate on data received into the receiving context memory; and a data mover cooperatively coupled to the loaded and receiving context memories to receive the data from the loaded context memory while the CPU is operating on the data in the loaded context memory, the loaded and receiving context memories serving as ping-pong buffers for simultaneously holding data in the loaded context memory for operation by the CPU, and receiving data from an upstream stage into the receiving context memory, and the data mover and the CPU coupled to write results of the CPU operating on data in the loaded context memory into a receiving context memory of a downstream stage.

10. A method for passing data among stages of a pipelined processing engine, each stage including a central processing unit (CPU), the method comprising the steps of:

operating the CPU on data in a loaded context memory;

receiving data from an upstream stage into a receiving context memory while the CPU operates on data in the loaded context memory;

switching the CPU to operate on data received into the receiving context memory, in response to completion of operation on the data in the loaded context memory; and coupling a data mover to the loaded and receiving context memories to receive the data from the loaded context memory while the CPU is operating on the data in the loaded context memory, the loaded and receiving context memories serving as ping-pong buffers for simultaneously holding data in the loaded context memory for operation by the CPU, and receiving data from an upstream stage into the receiving context memory.

11. The method as in claim 10 further comprising the step of:

coupling the data mover and the CPU to write results of the CPU operating on data in the loaded context memory into a receiving context memory of a downstream stage.

12. A method for passing data among stages of a pipelined processing engine, each stage including a central processing unit (CPU), the method comprising the steps of:

operating the CPU on data in a loaded context memory;

receiving data from an upstream stage into a receiving context memory while the CPU operates on data in the loaded context memory;

switching the CPU to operate on data received into the receiving context memory, in response to completion of operation on the data in the loaded context memory;

coupling a data mover to the loaded and receiving context memories to receive the data from the loaded context memory while the CPU is operating on the data in the loaded context memory, the loaded and receiving context memories serving as ping-pong buffers for simultaneously holding data in the loaded context memory for operation by the CPU, and receiving data from an upstream stage into the receiving context memory; and, coupling the data mover and the CPU to write results of the CPU operating on data in the loaded context memory into a receiving context memory of a downstream stage.

13. A computer readable medium, including program instructions for executing on a processor, for performing the method of claim 2 or claim 10 or claim 12.

14. Electromagnetic signals carrying instructions for execution on a processor for performing the method of claim 2 or claim 10 or claim 12.

* * * * *

UNITED STATES PATENT AND TRADEMARK OFFICE
CERTIFICATE OF CORRECTION

PATENT NO. : 6,442,669 B2
DATED : August 27, 2002
INVENTOR(S) : Michael L. Wright It is certified that error appears in the above-identified patent and that said Letters Patent is hereby corrected as shown below:

<u>Title page, item [54] and Column 1, line 1,</u>
Delete title, "ARCHITECTURE FOR A PROCESS COMPLEX OF AN ARRAYED PIPE-LINED PROCESSING ENGINE" and substitute therefore
-- ARCHITECTURE FOR A PROCESSOR COMPLEX OF AN ARRAYED PIPELINED PROCESSING ENGINE --

Signed and Sealed this

Seventeenth Day of December, 2002

JAMES E. ROGAN
*Director of the United States Patent and Trademark Office*